United States Patent Office 2,943,961
Patented July 5, 1960

2,943,961

PREVENTION OF IRREGULAR SCALING OF FERROUS METALS

James L. Ma, Coatesville, Pa., assignor to Lukens Steel Company, Coatesville, Pa., a corporation of Pennsylvania No Drawing. Filed Mar. 7, 1958, Ser. No. 719,927

4 Claims. (Cl. 148—14)

This invention relates to a method of preventing the formation of "alligator scale" on metallic surfaces during the step of annealing metallic plates, and more particularly the prevention of such scale on the backing steel of clad plates.

After quite extensive experimentation, it has been found that aqueous mixtures of magnesium chromate and calcium oxide in the range of 5% to 35% of calcium oxide are effective in preventing the formation of "alligator scale" on the backing plates of clad steel during the annealing step. While the range of 5% to 35% of calcium oxide in the mixture of calcium oxide and magnesium chromate has been found to be effective, it has been determined that the most effective mixture is 15% calcium oxide and 85% magnesium chromate on a dry basis, the same being the preferred mixture.

The scale referred to above as "alligator scale" relates to the irregular and uneven scales formed on backing steel surfaces of clad plates, and due to the fact that such scales have the appearance of alligator hide, the term "alligator scale" has been applied to this scale formation. This type of scale develops during the solution annealing of stainless steel clad plates at a temperature of approximately 1950° F. The prevention of such scale eliminates, or at least greatly reduces, the cost of preparing the clad metal for use. Heretofore, it has been necessary to use much hand grinding to remove such scale at great cost to the manufacturers.

It has now been determined that the conditions under which "alligator scale" is formed are principally the presence of excess oxygen in the heating atmosphere over 1500° F., and the blister formation in the scale on the plates. While it is recognized that plates could be annealed without the formation of alligator scale if the heating were done in an atmosphere free from oxygen, such an operation requires specially made and more expensive furnaces. Accordingly, from these studies there has developed the method of this application which has proven most satisfactory in the making of clad steel plates.

In the preparation of the coating, a batch of magnesium chromate of the required weight is first dissolved in water to a syrupy consistency. Then a similar batch of calcium oxide is added to water in a separate container until a paste-like slurry is formed. After the reaction of the calcium oxide in the water is finished, the slurry is added to the magnesium chromate solution until a homogeneous mixture is obtained, the mixture being stirred during the time the slurry is being added to the solution.

Before being used the mixture is further diluted with water to give a water to solids ratio of 1 to 3 depending upon the calcium oxide present. Since the calcium oxide has a tendency to settle rather quickly to the bottom of the container, it is necessary to thoroughly stir the mixture before use. After it is thoroughly mixed, the mixture is applied as a coating to the plate surface with a lamb's wool covered roller, or other suitable tool, until the plate surface is completely and uniformly covered. The plate is then dried until the moisture has evaporated to a point where the coating would not stick between plates. The plate is then annealed in a furnace at a temperature of approximately 1950° F. for a period of approximately one hour per inch of plate thickness. Following the annealing step, the plate is removed from the furnace and allowed to air cool to the room temperature, after which it is flame descaled by a hand torch and pickled.

The above described coating process does not eliminate scaling entirely but it does reduce the irregularity of the scale to a point where it produces a smooth surface which can be conditioned by flame descaling and pickling.

The calcium oxide used in the coating mixture is CaO, commonly known in the trade as "quicklime."

The above description discloses a single embodiment of the invention, and specific language has been employed in describing the same. It will, nevertheless, be understood that no limitations of the scope of the invention are thereby contemplated, and that various alterations and modifications may be made as would occur to one skilled in the art to which the invention relates.

I claim:

1. The method of preventing alligator scale formation on the backing steel of a clad plate which comprises, forming an aqueous mixture consisting essentially of magnesium chromate, and calcium oxide in the range of 5% to 35% calcium oxide, coating said plate with said aqueous mixture, drying said coating, and annealing said plate at a temperature of approximately 1950° F.

2. The method of preventing alligator scale formation on the backing steel of a clad plate which comprises, forming an aqueous mixture of magnesium chromate in the range of 65% to 95% and calcium oxide in the range of 5% to 35%, adding water to the mixture to give a water to solids ratio from 1 to 3, coating said backing steel, drying said coated steel in the air, and annealing said plate at a temperature of approximately 1950° F. for one hour per inch of thickness.

3. The method of preventing alligator scale formation on the backing steel of a clad steel plate which comprises, forming an aqueous mixture of 15% calcium oxide and 85% magnesium chromate, forming a uniform coating on said backing steel, drying said coating in the air, stacking said plate in a furnace and annealing it at a temperature of 1950° F. for one hour per inch of thickness, and cooling said plate to room temperature.

4. The method of treatment of the backing steel plate prior to cladding said backing steel plate in order to at least partially eliminate alligator scale, consisting of applying to at least one surface of said plate an aqueous mixture of magnesium chromate and calcium oxide, the calcium oxide being 15% and the magnesium chromate being 85% of the mixture on a dry basis, drying the coating, and subjecting the coated plate to an annealing temperature of approximately 1950° F.

References Cited in the file of this patent

UNITED STATES PATENTS

| 2,321,917 | Jenkins et al. | June 15, 1943 |

FOREIGN PATENTS

| 537,529 | Canada | Feb. 26, 1957 |
| 558,792 | Great Britain | Jan. 21, 1944 |
| 713,420 | Great Britain | Aug. 11, 1954 |